(12) United States Patent
Agehama (10) Patent No.: US 11,947,852 B2
(45) Date of Patent: Apr. 2, 2024

(54) IMAGE FORMING APPARATUS AND NON-TRANSITORY COMPUTER READABLE MEDIUM STORING IMAGE FORMING PROGRAM CAPABLE OF PERFORMING REPRINT PROCESS FOR DEFECTIVE PAGES AND OUTPUTTING REPRINT PAGES TOGETHER WITH PAGES OF GOOD PRINT RESULTS

(71) Applicant: FUJIFILM Business Innovation Corp., Tokyo (JP)

(72) Inventor: Ryo Agehama, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 445 days.

(21) Appl. No.: 17/167,028

(22) Filed: Feb. 3, 2021

(65) Prior Publication Data

US 2022/0083294 A1    Mar. 17, 2022

(30) Foreign Application Priority Data

Sep. 16, 2020   (JP) ................ 2020-155577

(51) Int. Cl.
*G06F 3/12* (2006.01)
*H04N 1/00* (2006.01)

(52) U.S. Cl.
CPC .......... *G06F 3/1255* (2013.01); *G06F 3/1207* (2013.01); *G06F 3/1208* (2013.01); *H04N 1/00692* (2013.01); *H04N 1/00694* (2013.01); *H04N 1/00724* (2013.01)

(58) Field of Classification Search
None
See application file for complete search history.

(56) References Cited

U.S. PATENT DOCUMENTS

| 8,205,868 | B2 | 6/2012 | Kubota | |
|---|---|---|---|---|
| 8,448,932 | B2 | 5/2013 | Kubota | |
| 10,379,791 | B2* | 8/2019 | Fukuda | B41J 29/48 |
| 2014/0285853 | A1* | 9/2014 | Hiramatsu | G06K 15/1872 358/3.24 |
| 2018/0063339 | A1* | 3/2018 | Pantin | H04N 1/00045 |
| 2018/0329352 | A1* | 11/2018 | Yamashita | G03G 15/703 |
| 2019/0155555 | A1* | 5/2019 | Ito | H04N 1/00037 |

FOREIGN PATENT DOCUMENTS

| JP | 5627222 | 11/2014 |
|---|---|---|
| JP | 2019008116 | 1/2019 |

* cited by examiner

*Primary Examiner* — Thomas D Lee
(74) *Attorney, Agent, or Firm* — JCIPRNET (57) ABSTRACT

The image forming apparatus includes a processor configured to perform a print process on print media of plural pages, based on print data for the plural pages, acquire reprinted pages by performing a reprint process on separate print media for defective pages for which a result of the print process is defective, with print settings determined according to an arrangement posture of excellent pages, for which a result of the print process is excellent, on a reuse tray, and output the excellent pages transported from the reuse tray and the reprinted pages together.

7 Claims, 9 Drawing Sheets

REPRINT PROCESS CANNOT BE PERFORMED.

THIS PRINTER DOES NOT HAVE PAPER TRAY CORRESPONDING TO A4L PAPER.

FIG. 5

POSTURES OF PAPERS DISPOSED ON REUSE TRAY ARE NOT ALIGNED.
PLEASE CORRECT POSTURES.

DO YOU WANT TO RESTART REPRINT PROCESS?

YES    NO

IMAGE FORMING APPARATUS AND NON-TRANSITORY COMPUTER READABLE MEDIUM STORING IMAGE FORMING PROGRAM CAPABLE OF PERFORMING REPRINT PROCESS FOR DEFECTIVE PAGES AND OUTPUTTING REPRINT PAGES TOGETHER WITH PAGES OF GOOD PRINT RESULTS

CROSS-REFERENCE TO RELATED APPLICATIONS

This application is based on and claims priority under 35 USC 119 from Japanese Patent Application No. 2020-155577 filed Sep. 16, 2020.

BACKGROUND

(i) Technical Field

The present invention relates to an image forming apparatus and a non-transitory computer readable medium storing an image forming program.

(ii) Related Art

JP2019-008116A discloses an image forming apparatus which determines the quality of the print result for each paper, by comparing the image data obtained by reading the paper printed through a print process with the RIP data used in the print process, and discharges paper having a good print result and paper having a poor print result into separate discharge trays.

JP5627222B is an image forming apparatus which inserts a plurality of sheets of tab paper having protrusions between a plurality of sheets of paper, and reads the inserted plurality of sheets of tab paper, and determines whether or not the order of the inserted tab paper is correct, according to the outer shape of the read tab paper.

SUMMARY

Incidentally, in the related art, among image forming apparatuses which perform a print process based on print data and outputs a printed print media (for example, paper), there is an image forming apparatus which performs an inspection process for determining the quality of a print result, which is the result of the print process, for each print media, discharges excellent pages, which are the print media determined to have good print results, to an OK tray, and discharges defective pages, which are the print media determined to have defective print results, to an NG tray. Such an image forming apparatus further reprints only the defective pages, and then outputs the reprinted pages obtained through the reprint process and the excellent pages together (that is, merge). The term "page" in the present specification means a physical page defined on print media, and is a concept different from a logical page defined on print data.

The above-described processes in the image forming apparatus in the related art will be specifically described with reference to FIGS. 7 to 10. FIGS. 7 to 10 show an image forming apparatus M in the related art including an OK tray O, an NG tray N, and a reuse tray R.

Figure 7:
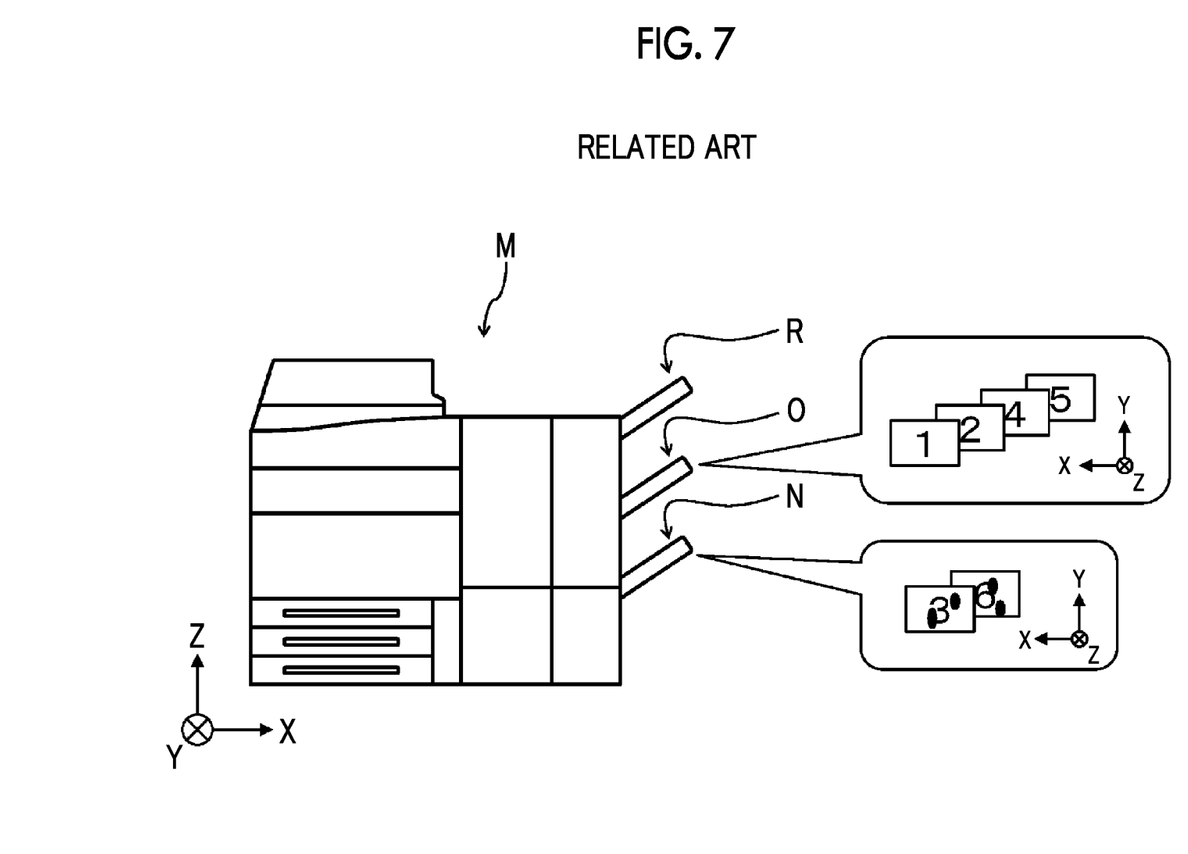
FIG. 7 is a diagram illustrating a state in which excellent pages are discharged to an OK tray and defective pages are discharged to an NG tray, in the related art.
Figure 8:
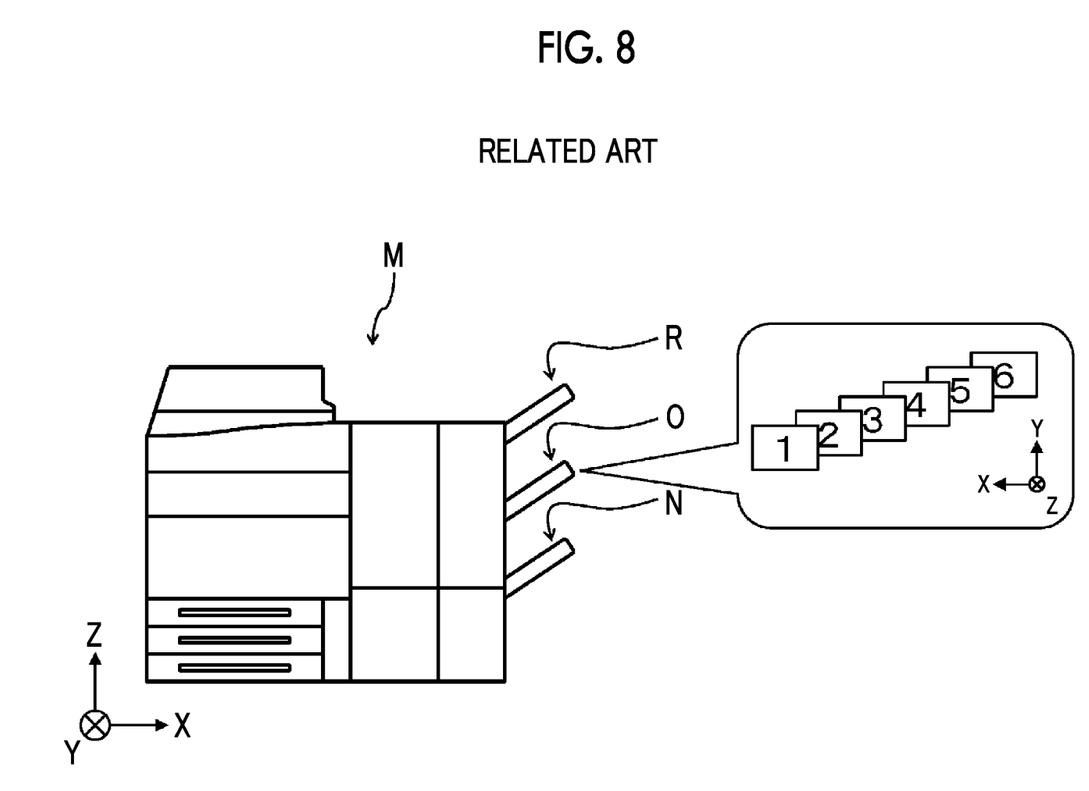
FIG. 8 is a diagram illustrating a state in which a reprint process is performed on a defective page, and an excellent page and a reprinted page are output together, in the related art.
Figure 10:
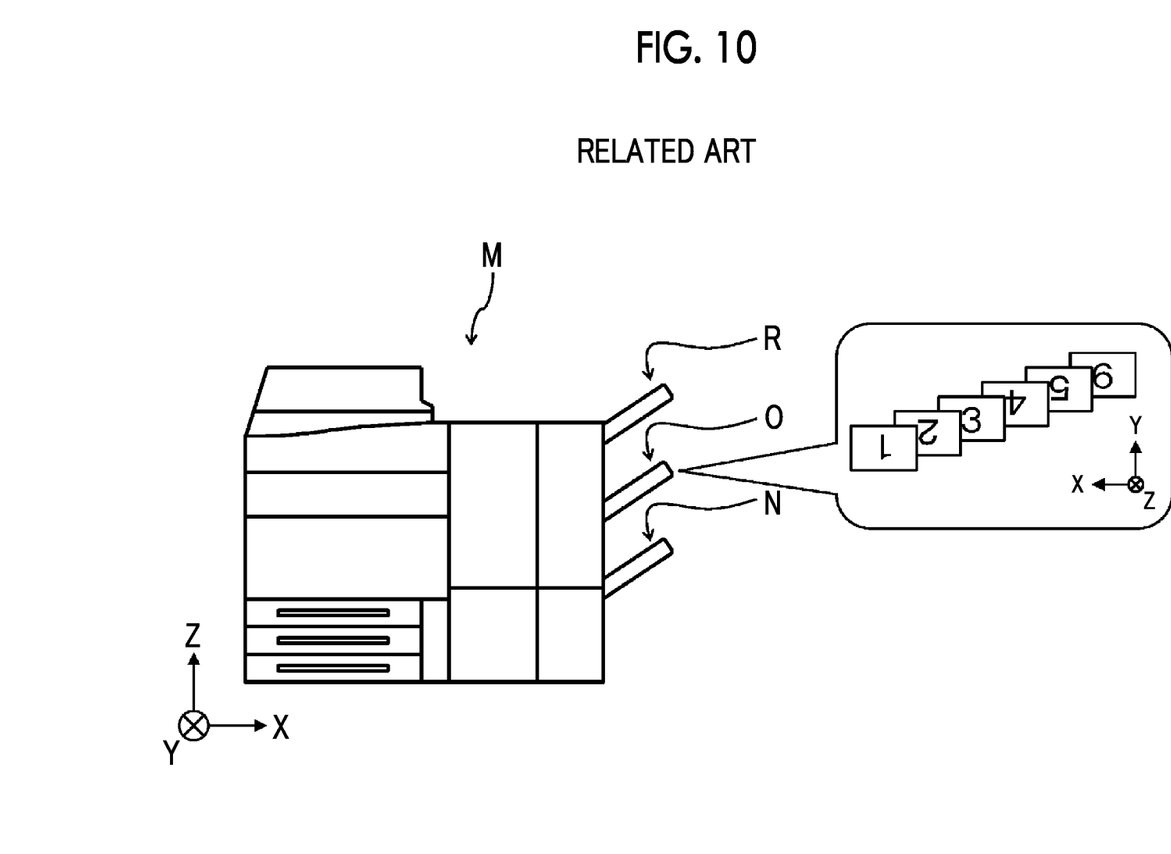
FIG. 10 is a diagram illustrating a state in which excellent pages and reprinted pages are output together in a case where the excellent pages are disposed on the reuse tray in an arrangement posture that does not correspond to the print setting, in the related art.

The image forming apparatus M performs a print process on print media having a plurality of pages, based on print data for a plurality of pages, and then executes an inspection process for determining the quality of the print result for each print media. For example, a printed print media is optically read by a scanner to acquire inspection image data, and a quality determination can be performed by comparing print data (more specifically, raster data) with the inspection image data. The excellent pages of which the print results are determined to be good are discharged to the OK tray O by the transport device (not illustrated) included in the image forming apparatus M, and the defective pages of which the print results are determined to be defective are discharged to the NG tray N by the transport device. FIG. 7 illustrates a state where six pages of print media are printed, the first, second, fourth, and fifth pages are excellent pages and are discharged to the OK tray O, and the third and sixth pages are defective pages and are discharged to the NG tray N. In addition, since the image forming apparatus M discharges the printed print media in backside discharge in which the print media is discharged with the printed side (the front surface in the case of double-sided printing) facing down, the printed print media in FIGS. 7, 8, and 10 are shown as viewed from below.

The user who has input the print data to the image forming apparatus M takes out the excellent pages discharged to the OK tray O, from the OK tray O, and disposes the excellent pages on the reuse tray R. Then, in a case where the user inputs an execution instruction of the reprint process to the image forming apparatus M, the image forming apparatus M acquires the reprinted page by performing the reprint process for printing only the pages corresponding to the defective pages, on the separate print media, based on the retained print data. Further, the image forming apparatus M discharges the excellent page and the reprinted page together into the OK tray O.

Specifically, the image forming apparatus M refers to the result of the above-described inspection process for each print media, and executes, in order for each page, a process of transporting and discharging the excellent pages disposed on the reuse tray R to the OK tray O in a case where it is determined to be good, and executing a reprint process and discharging the reprinted page to the OK tray O in a case where it is determined to be defective. Here, in a transport process of the excellent pages from the reuse tray R to the OK tray O, it is assumed that the plurality of excellent pages disposed on the reuse tray R are transported from the excellent page at the top and are discharged to the OK tray O while only the front and back orientation of the excellent pages are inverted. For example, in a case where a plurality of excellent pages are disposed on the reuse tray R with the printed side facing up, it is assumed that the excellent page at the top among the plurality of excellent pages is transported, and is discharged to the OK tray O while the printed side facing downward.

Assuming that the excellent pages are disposed on the reuse tray R in page order (in order with the first page on top), in the example of FIG. 7, the inspection result of the first page is good due to this process, so that the image forming apparatus M transports one excellent page disposed on the reuse tray R to the OK tray O. Here, the excellent page of the first page is transported from the reuse tray R and discharged to the OK tray O. Next, since the inspection result on the second page is good, the image forming apparatus M transports one excellent page disposed on the reuse tray R to the OK tray O. Here, the excellent page of the second page is transported from the reuse tray R and discharged to the OK tray O. Next, since the inspection result of the third page is defective, the image forming apparatus M executes the reprint process for the third page, and the obtained reprinted page of the third page is discharged to the OK tray O. Similarly, the excellent page of the fourth page is transported from the reuse tray R and discharged to the OK tray O, the excellent page of the fifth page is transported from the reuse tray R and discharged to the OK tray O, and for the sixth page, the reprinted page that has been reprinted is discharged to the OK tray O. The above-described inspection process is executed on the reprinted pages, and in a case where it is determined that the print result of the reprinted pages is defective, the reprinted pages are discharged to the NG tray N as defective pages.

In a case where it is determined that all the print results of the reprinted pages are good, as illustrated in FIG. 8, the excellent pages and the reprinted pages are collected together, and more specifically, the excellent pages and the reprinted pages are aligned in the page order and discharged to the OK tray O.

Here, in the transport process of the excellent pages from the reuse tray R to the OK tray O, it is assumed that the postures are not changed other than the above-described front and back inversion. The posture of the print media in the present specification includes the orientation of print media (portrait or landscape), the front and back of the print media (whether the front surface is the upper side or the back surface is the upper side), and the orientation of the image in the print media (in other words, the rotation angle, 0 degrees, 90 degrees, 180 degrees, or 270 degrees). Therefore, due to the fact that the arrangement posture of the excellent page on the reuse tray R and the print setting of the reprint process for reprinting the defective page (particularly the setting for determining the posture of the reprinted page to be discharged) do not correspond to each other, the posture of the excellent page and the posture of the reprinted page, which are output together, may not be aligned.

Figure 9:
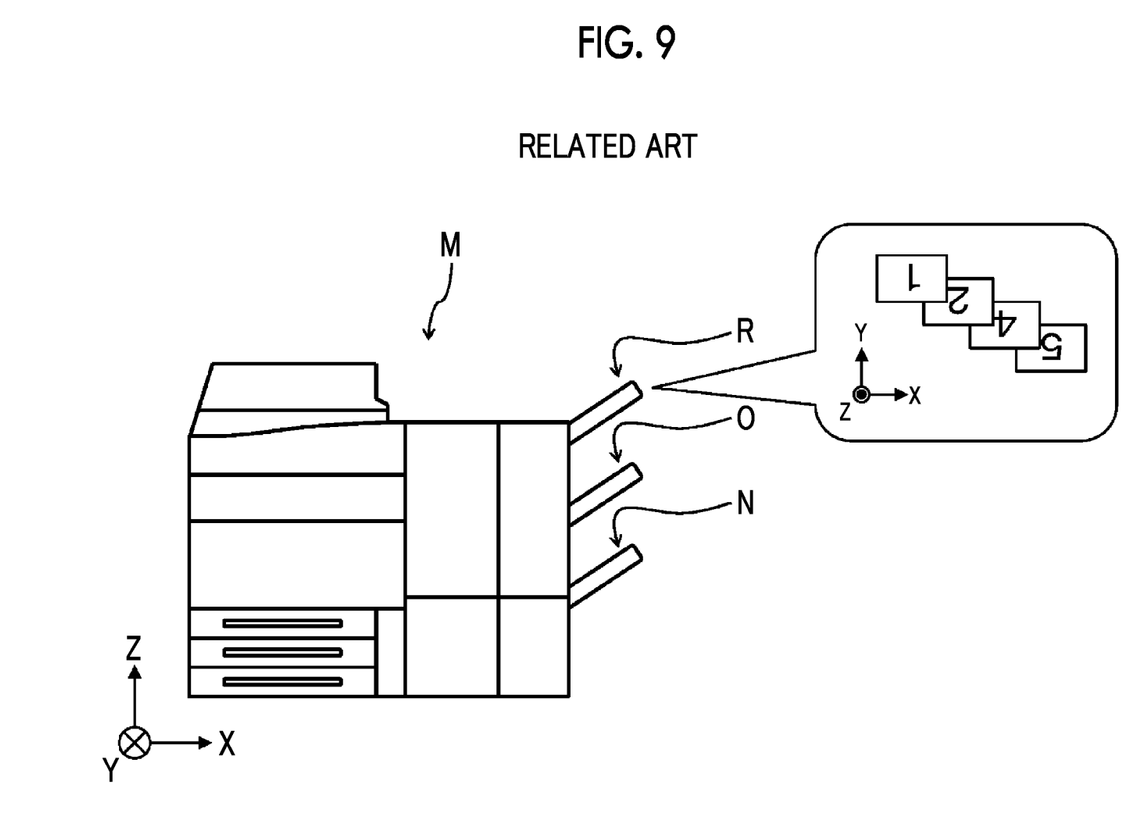
FIG. 9 is a diagram illustrating a state in which excellent pages are disposed on the reuse tray in an arrangement posture that does not correspond to print settings, in the related art.

For example, considered is a case where as shown on pages 3 and 6 which are the reprinted pages shown in FIG. 8, the print setting in the reprint process is set to discharge the reprinted page in a posture in which in the portrait orientation (a direction in which the transport direction of the print media is parallel to the long side of the print media), the back surface is the upper side, and the image orientation is the upright direction (here, the direction in which the positive side of the Y axis is the upper side), and a case where, as shown in FIG. 9, the user disposes excellent pages on the reuse tray R in an arrangement posture in which in the portrait orientation, the front surface is the upper side, and the image orientation is the inverted direction (the direction opposite to the upright direction, here, the direction in which the negative side of the Y axis is the upper side). In FIG. 9, the excellent pages disposed on the reuse tray R are shown as viewed from above.

In this case, as shown in FIG. 10, the excellent pages (first, second, fourth, and fifth pages in the example of FIG. 10) are discharged to the OK tray O while only the front and back orientation are inverted, so that the excellent pages are discharged in a posture in which in the portrait orientation, the back surface is the upper side, and the image orientation is the inverted direction, while reprinted pages (third and sixth pages in the example of FIG. 10) are discharged to the OK tray O in a posture in which in the portrait orientation, the back surface is the upper side, and the image orientation is the upright direction. That is, since the excellent pages are discharged in the posture in which the image orientation is in the inverted direction and the reprinted pages are discharged in the posture in which the image orientation is in the upright direction, the posture of the excellent page and the posture of the reprinted page, discharged to the OK tray O, do not match.

Aspects of non-limiting embodiments of the present disclosure relate to an image forming apparatus and a non-transitory computer readable medium storing an image forming program, in which excellent pages for which a print result is good and reprinted pages are output together while the postures of the excellent pages and the reprinted pages are aligned, in a case where a print process is performed on print data for a plurality of pages and the reprinted pages are acquired by performing a reprint process on defective pages for which a print result is defective.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image forming apparatus including a processor configured to perform a print process on print media of a plurality of pages, based on print data for the plurality of pages, acquire reprinted pages by performing a reprint process on separate print media for defective pages for which a result of the print process is defective, with print settings determined according to an arrangement posture of excellent pages, for which a result of the print process is excellent, on a reuse tray, and output the excellent pages transported from the reuse tray and the reprinted pages together.

BRIEF DESCRIPTION OF THE DRAWINGS

Exemplary embodiment(s) of the present invention will be described in detail based on the following figures, wherein.

DETAILED DESCRIPTION

Figure 1:
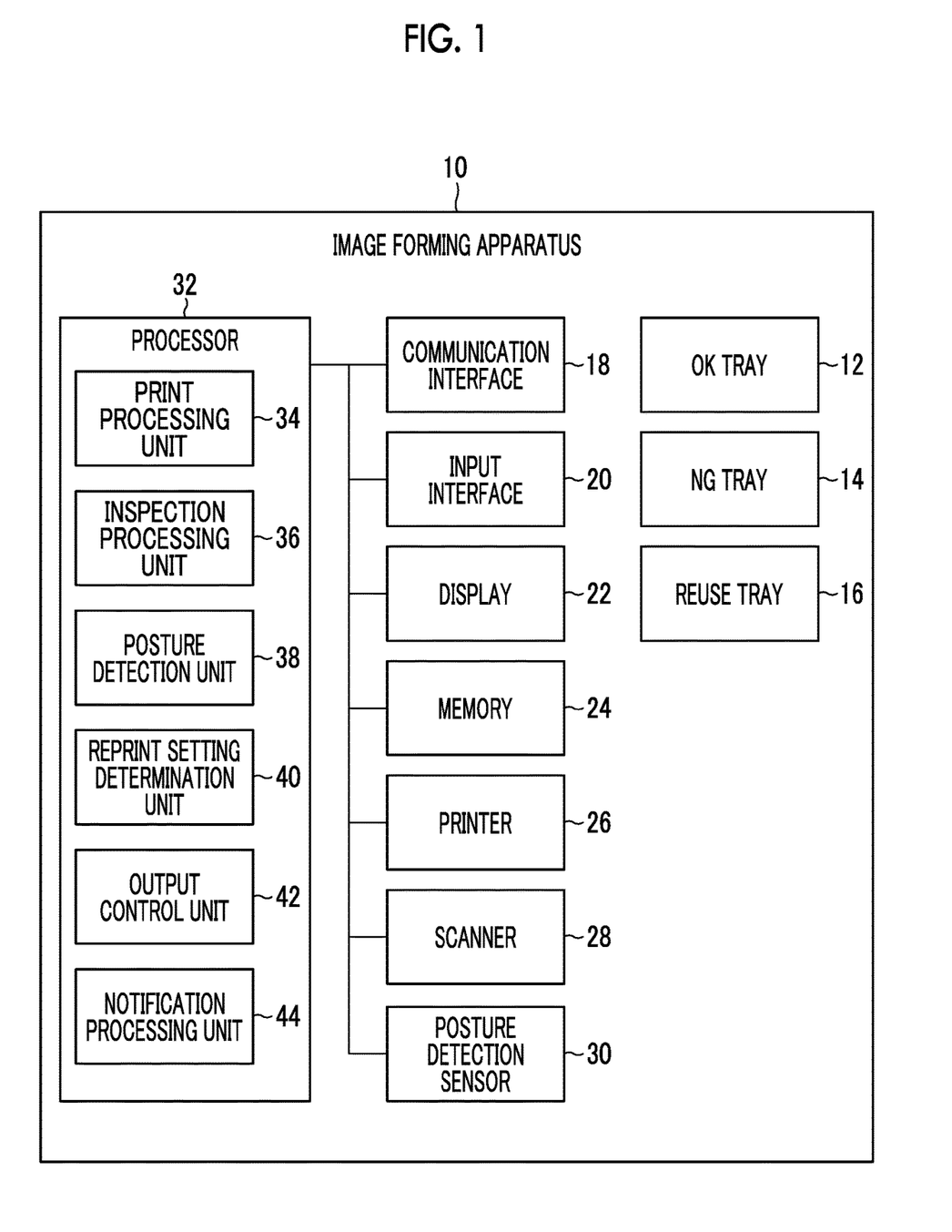
FIG. 1 is a schematic configuration diagram of an image forming apparatus according to the present exemplary embodiment.

FIG. 1 is a schematic configuration diagram of an image forming apparatus 10 as an information processing apparatus according to the present exemplary embodiment. The image forming apparatus 10 according to the present exemplary embodiment is a multifunction peripheral having a print function, a scan (image reading) function, a copy function, an image data transmission function, and the like.

The OK tray 12 and the NG tray 14 are both discharge trays to which print media such as printed paper are discharged. Excellent pages, which are print media determined to have good print results by an inspection processing unit 36 described later, are discharged to the OK tray 12 by a transport device (not illustrated) included in the image forming apparatus 10. Defective pages, which are print media determined to have defective print results by the inspection processing unit 36, are discharged to the NG tray 14 by the transport device.

The reuse tray 16 is a manual paper tray on which a user disposes print media. As will be described later, excellent pages are disposed on the reuse tray 16, and the excellent pages disposed on the reuse tray 16 are transported by the transport device in accordance with the reprint process described later and discharged to the OK tray 12. Similar to the image forming apparatus in the related art, even in the image forming apparatus 10, in the transport process of the excellent pages from the reuse tray 16 to the OK tray 12, the plurality of excellent pages disposed on the reuse tray 16 are transported from the excellent page at the top, and only the front and back orientation of the excellent pages are inverted and discharged to the OK tray 12. Further, in the transport process of excellent pages, the postures are not changed other than the above-described front and back inversion.

The communication interface 18 includes, for example, a network adapter and the like. The communication interface 18 exhibits a function of communicating with other apparatuses (for example, a user terminal used by a user) via a communication line such as a Local Area Network (LAN). The communication interface 18 receives a print job as a print request from the user terminal.

The print job is setting information indicating print settings and data having print data to be printed. For example, the print settings are set by the user, and the print data is selected by the user.

The print settings indicated in the setting information include setting values for various setting items. In particular, in the present exemplary embodiment, the print setting includes a setting value for a setting item for determining the discharge posture of the printed print media. As described above, the posture of the print media includes the orientation of print media (portrait or landscape), the front and back of print media (whether the front surface is facing up or the back surface is facing up), and the orientation of the image in the print media (in other words, the rotation angle, 0 degrees (upright direction), 90 degrees, 180 degrees (inverted direction), or 270 degrees).

For example, in the print setting, there is a paper size setting as a setting item for determining the orientation of the print media. For example, in a case where the setting value for the paper size is A4S, the discharge posture of the print media is a portrait orientation, and in a case where the setting value for the paper size is A4L, the discharge posture of the print media is a landscape orientation. Here, assuming that the print media is rectangular, the posture in which the transport direction of the print media and the long side of the print media are parallel is called a portrait orientation, and the posture in which the transport direction of the print media and the short side of the print media are parallel is called a landscape orientation.

In addition, there is a discharge surface setting as a setting item for determining the front and back of print media. In a case where the setting value for the discharge surface is frontside discharge, in the discharge posture of the print media, the front surface is turned upward. In a case where the setting value for the discharge surface is backside discharge, in the discharge posture of the print media, the back surface is turned upward. In the case of frontside discharge, there is an advantage that it is easy to check the printed side of the discharged print media, while the plurality of discharged print media are arranged in the reverse order of the page order (the last page facing upward is located at the top).

Further, there is an image rotation angle setting as a setting item for determining the orientation of the image in the print media. The rotation angle setting indicates the rotation angle of the image printed on the print media, and for example, values of 0 degree, 90 degree, 180 degree, and 270 degree can be set.

The input interface 20 includes, for example, a touch panel or buttons. The input interface 20 is used by the user to input various instructions to the image forming apparatus 10.

The display 22 includes, for example, a liquid crystal panel. Various screens are displayed on the display 22. For example, the display 22 displays a screen for notifying the user of various types of information through the process of a notification processing unit 44 described later.

The memory 24 includes, for example, a Hard Disk Drive (HHD), a Solid State Drive (SSD), a Read Only Memory (ROM), a Random Access Memory (RAM), and the like. The memory 24 may be provided separately from a processor 32 described later, or at least a part the memory may be provided inside the processor 32. The memory 24 stores an image forming program for operating each unit of the image forming apparatus 10.

The printer 26 includes, for example, a charging device, a photosensitive drum, a toner, and the like. The printer 26 executes a print process for printing print data included in a print job input from the user, on print media transported by a transport device from print media tray (for example, a paper tray) (not illustrated) in which the print media is stocked, based on the instruction of the processor 32 (particularly, a print processing unit 34 described later). In the present exemplary embodiment, the printer 26 performs a print process on print media of a plurality of pages, based on print data for a plurality of pages.

Further, the printer 26 acquires a reprinted page by performing a reprint process for printing, on separate print media, a defective page of which a result of the print process is determined to be defective, by the inspection process by the inspection processing unit 36 described later. The details of the reprint process will be described later.

The scanner 28 includes, for example, a light source and a Charge Coupled Device (CCD). The scanner 28 optically reads the print media that has been printed by the printer 26 to form inspection image data. The inspection image data is used by the inspection processing unit 36.

The posture detection sensor 30 is a sensor that detects the arrangement posture of the print media, that is, the excellent page, disposed on the reuse tray 16. The posture detection sensor 30 includes, for example, a light source and a CCD that optically read an excellent page pulled into the image forming apparatus 10 from the reuse tray 16 by the transport device. Although not limited to this, in the present exemplary embodiment, the posture detection sensor 30 reads the upper side surface of the excellent page disposed on the reuse tray 16. The posture detection image data acquired by the light source and the CCD is used by a posture detection unit 38 described later. According to the posture detection image data, the posture of excellent page including the orientation of the excellent page, the front and back of the excellent page, and the orientation of the image in the excellent page can be detected.

In the embodiments above, the term "processor" refers to hardware in abroad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed. As illustrated in FIG. 1, the processor 32 uses the image forming program stored in the memory 24 to function as the print processing unit 34, the inspection processing unit 36, the posture detection unit 38, a reprint setting determination unit 40, an output control unit 42, and the notification processing unit 44.

The print processing unit 34 causes a printer 26 to execute a print process for printing an image corresponding to the print data on a print media of a plurality of pages, based on the print data for a plurality of pages included in the print job received by the image forming apparatus 10. Specifically, the print processing unit 34 executes a rasterization process for converting vector format print data that the printer 26 cannot recognize into raster format print data (for example, a bitmap image) that the printer 26 can recognize. Then, the generated raster format print data is sent to the printer 26, and the printer 26 is made to execute the print process.

Further, the print processing unit 34 retains the print data until the inspection processing unit 36, which will be described later, determines that all the print results of the printed print media are good. Then, in a case where the user inputs an execution instruction for the reprint process, the print processing unit 34 executes a reprint process for acquiring a reprinted page by printing, on separate print media, a defective page determined to be defective by the inspection process of the inspection processing unit 36, based on the retained print data.

In a case where the print process by the printer 26 is completed, the inspection processing unit 36 executes an inspection process for determining the quality of the print result for each print media. The inspection process may be any method, but in the present exemplary embodiment, the inspection processing unit 36 performs the inspection process, based on the inspection image data acquired by optically reading scanning the print media that has been printed by the scanner 28. Specifically, the inspection processing unit 36 performs the inspection process by comparing the raster format print data generated by the print processing unit 34 with the inspection image data. Specifically, the inspection processing unit 36 determines that the print result of the print media is good in a case where the similarity between the two items of data is equal to or higher than a predetermined threshold value, and determines that the print result of the print media is defective in a case where the similarity between the two items of data is less than the predetermined threshold value.

The excellent page, which is print media determined to have a good print result by the inspection processing unit 36, is discharged to the OK tray 12 by the transport device. The discharge posture of the excellent page to the OK tray 12 at this time is determined based on the print setting of the print job. Further, the defective page, which is print media which is determined to have a defective print result by the inspection processing unit 36, is discharged to the NG tray 14 by the transport device.

In a case where one or more defective pages are discharged to the NG tray 14, the user takes out the excellent pages from the OK tray 12 and disposes the excellent pages in the reuse tray 16 for the reprint process. In the present exemplary embodiment, an excellent page set including a plurality of excellent pages is disposed on the reuse tray 16. In addition, only one excellent page may be disposed on the reuse tray 16. Here, since the excellent page set is disposed on the reuse tray 16 by the user, the excellent page set can be disposed on the reuse tray 16 in various postures. After disposing the excellent page set on the reuse tray 16, the user inputs an execution instruction of the reprint process to the image forming apparatus 10 by using the input interface 20 or the like.

In a case where the user inputs an execution instruction for the reprint process, the posture detection unit 38 detects the arrangement posture of the excellent page on the reuse tray 16.

First, the posture detection unit 39 can detect the orientation of the excellent page disposed on the reuse tray 16, based on the outer shape of the excellent page indicated by the posture detection data.

Next, the posture detection unit 38 detects the front and back and the image orientation of the excellent page on the reuse tray 16, by comparing the raster format print data generated by the print processing unit 34 with the posture detection image data acquired by the posture detection sensor 30. For example, in a case where the first page is an excellent page as a result of the inspection process by the inspection processing unit 36, the transport device pulls the excellent page at the top, of the excellent page set disposed on the reuse tray 16, into the image forming apparatus 10, and the posture detection sensor 30 acquires the posture detection image data of the excellent page. Then, the posture detection unit 38 compares the posture detection image data acquired by the posture detection sensor 30 with the print data of the first page in the raster format. Here, it is assumed that the excellent page at the top in the excellent page set disposed on the reuse tray 16 is the first page. A case where the excellent page at the top is not the first page will be described later.

The orientation of the posture detection image data may change depending on the reading direction by the posture detection sensor 30, but for example, in a case where the print data and the posture detection image data match, the posture detection unit 38 can determine that the front surface is the upper side and the orientation (rotation angle) of the image is 0 degrees. Further, in the present exemplary embodiment, in a case where the posture detection image data is obtained by reading the upper-side surface of the excellent page, in a case where the posture detection image data indicates a blank paper (the excellent page is printed on one side) or in a case where the posture detection image data matches the print data of another page (for example, the page next to the inspection target page) (in a case where the excellent page is printed on both sides), the posture detection unit 38 can determine that the excellent page is in a posture with the back side facing up. Further, the rotation angle of the image can be determined based on the orientation (rotation angle) of the posture detection image data with respect to the print data.

The reprint setting determination unit 40 determines a print setting related to the reprint process for a defective page determined to be defective by the inspection processing unit 36, according to the arrangement posture of the excellent page on the reuse tray 16, detected by the posture detection unit 38. Specifically, the reprint setting determination unit 40 determines the print settings for the reprint process (particularly the settings for determining the discharge posture of the reprinted page) such that the discharge posture of excellent pages transported from the reuse tray 16 to the OK tray 12 and the discharge posture of the reprinted page obtained by the reprint process of the print processing unit 34 to the OK tray 12 are identical to each other. The print setting of the reprint process may be identical to or different from the print setting of the print process for printing the excellent page and the defective page.

Figure 2:
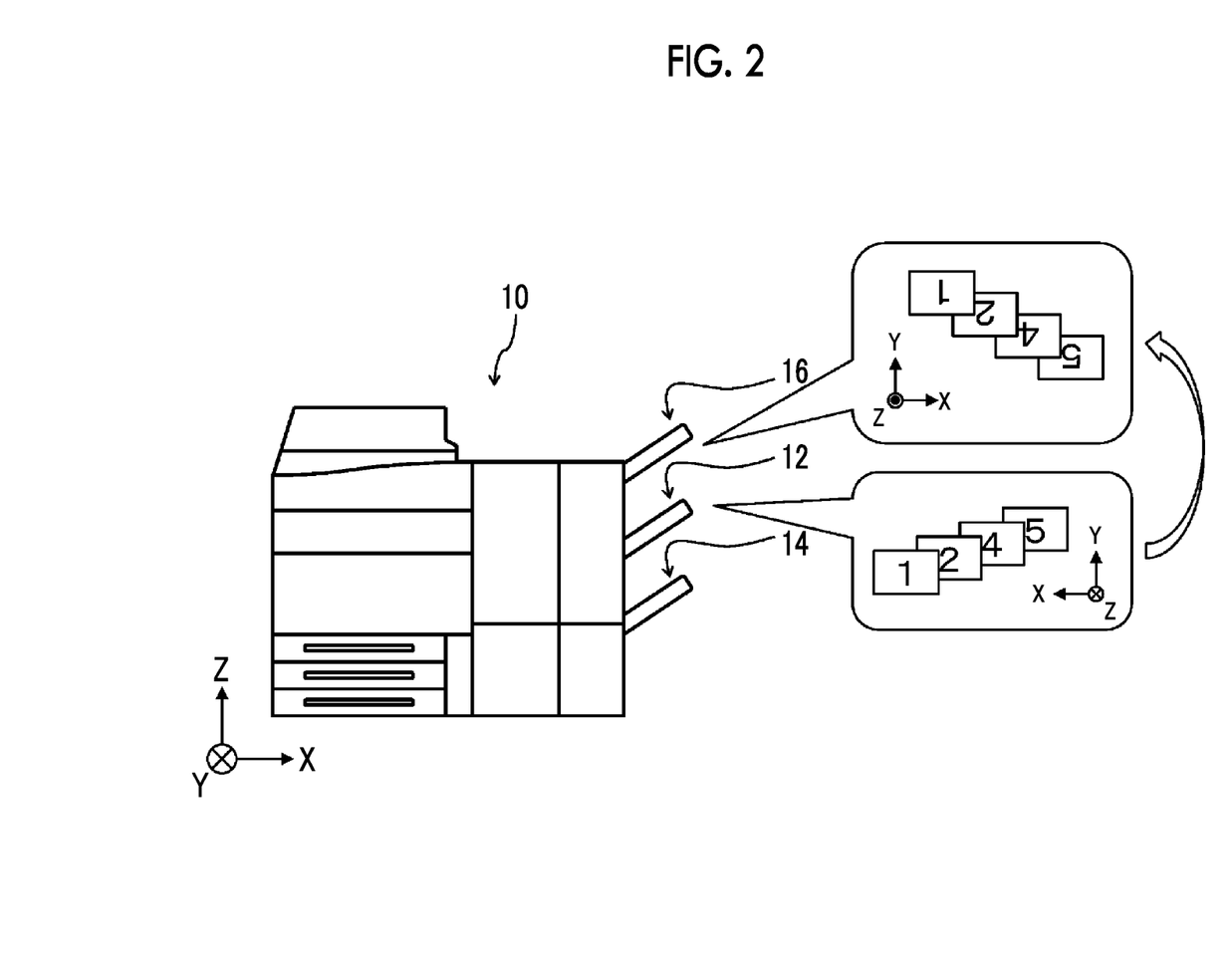
FIG. 2 is a diagram illustrating a state in which excellent pages are disposed on a reuse tray, in the present exemplary embodiment.

For example, the print processing unit 34 performs a print process with a print setting in which the paper size setting is A4S, the discharge surface setting is backside discharge, and the rotation angle setting is 0 degree, and it is assumed that the first, second, fourth and fifth pages are discharged as excellent pages to the OK tray 12 in the posture illustrated in FIG. 2. The excellent page set discharged to the OK tray 12 is shown as viewed from below. It should be noted here that when the rotation angle setting is 0 degrees, the orientation of the image in the excellent page is the orientation in which the positive side of the Y axis is the upper side (here, this orientation is referred to as the upright direction). The user then disposes the excellent page set in the reuse tray 16. Here, it is assumed that the arrangement posture of the excellent page set on the reuse tray 16 is such that in a portrait orientation, the front surface is the upper side, and the image orientation is the inverted direction (here, the orientation of the printed image is a direction in which the negative side of the Y axis is the upper side). The excellent page set disposed on the reuse tray 16 is shown as viewed from above. In this case, according to the reprint process, the transport device turns the excellent pages upside down and discharges the excellent pages to the OK tray 12 while maintaining the other postures, so that the discharge posture of the excellent pages to the OK tray 12 is that in a portrait orientation, the back surface is the upper side, and the image orientation is the inverted direction. Therefore, the reprint setting determination unit 40 determines the print setting of the reprint process such that the discharge posture of the reprinted page to the OK tray 12 is that in a portrait orientation, the back surface is the upper side, and the image orientation is the inverted direction. As the print setting in this case, for example, the paper size setting is A4S, the discharge surface setting is backside discharge, and the rotation angle setting is 180 degrees.

The print processing unit 34 executes the reprint process on the defective page with the print setting determined by the reprint setting determination unit 40, and acquires the reprinted page.

The output control unit 42 performs a discharge control related to the re-discharge process for sequentially discharging the excellent page set transported from the reuse tray 16 to the OK tray 12 due to the reprint process by the print processing unit 34, and sequentially discharging the reprinted pages acquired by the reprint process to the OK tray 12. Specifically, the output control unit 42 performs controls to discharge the excellent page set and the reprinted page together to the OK tray 12 so as to be arranged in the page order defined by the print data. The inspection processing unit 36 may execute the inspection process on the reprinted pages, and may discharge only the reprinted pages that are determined to be good in the inspection process to the OK tray 12.

The specific procedure of discharge control by the output control unit 42 is as follows. First, the output control unit 42 refers to the result of the inspection process by the inspection processing unit 36, and executes a process for each page which transports and discharges the excellent pages disposed on the reuse tray 16 to the OK tray 12 in a case where it is determined to be good, and discharges the reprinted page obtained by a reprint process to the OK tray 12 in a case where it is determined to be defective.

Here, in the present exemplary embodiment, the user determines that setting the excellent page on the reuse tray 16 with the front surface facing upward is a correct way. Further, as described above, the excellent page set disposed on the reuse tray 16 is transported from the excellent page at the top. Accordingly, in a case where the print process by the print processing unit 34 is backside discharge (that is, in a case where the excellent page is backside-discharged to the OK tray 12), the discharge control by the output control unit 42 is executed by page from the first page to the last page. In a case where the print process by the print processing unit 34 is frontside discharge (that is, in a case where the excellent page is frontside-discharged to the OK tray 12), the discharge control by the output control unit 42 is executed by page from the last page to the first page. Here, a case where the discharge control by the output control unit 42 is executed from the first page will be described.

Figure 3:
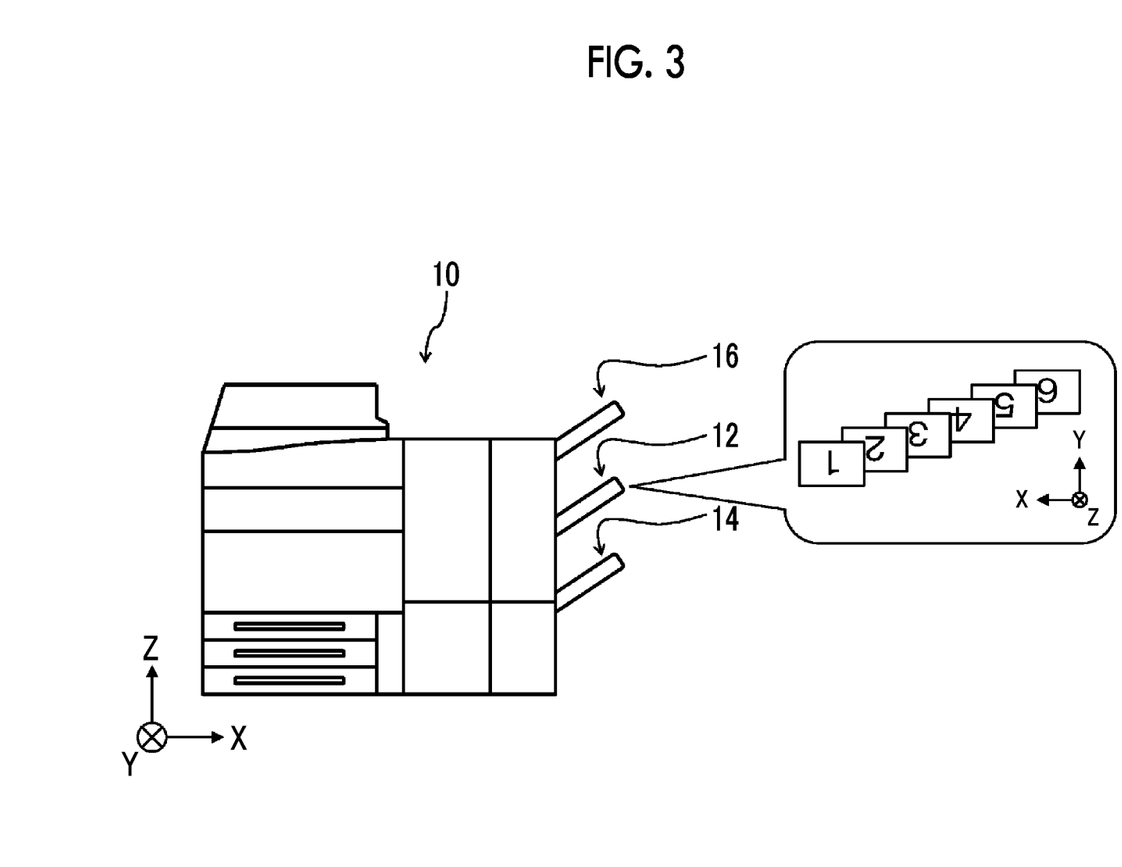
FIG. 3 is a diagram illustrating a state in which excellent pages and reprinted pages are output together with the postures aligned, in the present exemplary embodiment.

In the example of FIG. 2, the print media output by the print process is a total of 6 pages, the first, second, fourth, and fifth pages are excellent pages, and the third and sixth pages are defective pages. Therefore, the output control unit 42 first causes the transport device to transport the first page from the reuse tray 16 and discharge the first page to the OK tray 12. During the process, the above-described processes of the posture detection unit 38 and the reprint setting determination unit 40 are executed. As described above, the discharge posture of the first and subsequent pages of the excellent pages to the OK tray 12 is that in a portrait orientation, the back surface is the upper side, and the image orientation is the inverted direction. Next, the output control unit 42 causes the transport device to transport the second page from the reuse tray 16 and discharge the second page to the OK tray 12. Next, since the third page is a defective page, the output control unit 42 discharges the reprinted page reprinted by the print processing unit 34 to the OK tray 12. According to the print setting of the reprint process by the reprint setting determination unit 40, the discharge posture of the reprinted pages of the third and sixth pages to the OK tray 12 is that in a portrait orientation, the back surface is the upper side, and the image orientation is the inverted direction, as described above. After that, similarly, the output control unit 42 discharges the excellent pages of the fourth and fifth pages to the OK tray 12, and discharges the reprinted page of the sixth page to the OK tray 12. FIG. 3 illustrates a state in which the excellent page set and the reprinted pages are output together with the postures aligned. In the example of FIG. 3, the excellent page set and the reprinted pages are shown as viewed from below.

In this way, the output control unit 42 determines the insertion position of the reprinted page with respect to the excellent page set, based on the result of the inspection process by the inspection processing unit 36. Thus, the excellent page set and the reprinted pages arranged in page order are discharged together to the OK tray 12.

The notification processing unit 44 provides various notifications to the user who has instructed the image forming apparatus 10 to perform the reprint process. As a method of notification by the notification processing unit 44, the notification screen is displayed on the display 22 in the present exemplary embodiment, but the notification method is not limited to this. For example, instead of or in addition to displaying the notification screen on the display 22, sound may be output from a speaker (not illustrated) provided in the image forming apparatus 10. Further, the identical notification screen may be displayed on the display of the user terminal used by the user.

Figure 4:
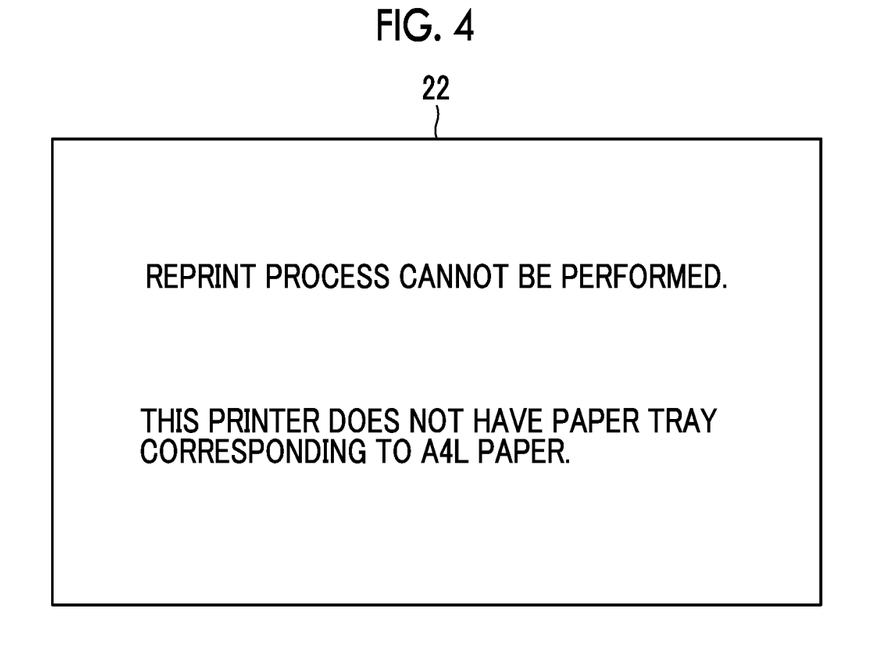
FIG. 4 is a diagram illustrating an example of a screen for notifying a user that a reprint process is not possible.

Specifically, in a case where the reprint process according to the print setting of the reprint process determined by the reprint setting determination unit 40 is not possible, the notification processing unit 44 notifies the user of that fact. For example, in a case where the posture detection unit 38 detects that the arrangement posture of the excellent page set on the reuse tray 16 is the landscape posture, the reprint setting determination unit 40 sets, for example, the paper size A4L, as the print setting for the reprint process. However, in a case where the image forming apparatus 10 is not provided with a paper tray corresponding to the A4L paper size, the print processing unit 34 cannot execute the reprint process with the print settings. In such a case, the notification processing unit 44 notifies the user that the reprint process cannot be executed. For example, as shown in FIG. 4, a message such as "Reprint process cannot be performed" is displayed on the display 22. In this case, the print processing unit 34 stops the reprint process, and the output control unit 42 also stops the discharge control associated with the reprint process.

Further, the notification processing unit 44 may notify the user of the reason why the reprint process according to the print setting of the reprint process determined by the reprint setting determination unit 40 is not possible, in addition to the fact that the reprint process cannot be executed. For example, in the above example, the reason why the reprint process is impossible is that the image forming apparatus 10 does not have a paper tray corresponding to the paper size of A4L. Therefore, as illustrated in FIG. 4, the notification processing unit 44 displays, for example, a message such as "This printer does not have a paper tray corresponding to A4L paper" on the display 22.

As described above, in the present exemplary embodiment, it is correct that the excellent page set is disposed on the reuse tray 16 with the front surface facing upward. In a case where the print process by the print processing unit 34 is backside discharge, the discharge control by the output control unit 42 is performed from the first page. In a case where the print process by the print processing unit 34 is frontside discharge, the discharge control by the output control unit is performed from the last page. Therefore, the notification processing unit 44 provides a notification to the user, in a case where the page order of the excellent page set disposed on the reuse tray 16 is not appropriate, such as a case where the user disposes the excellent page set with the back surface facing upward. For example, the notification processing unit 44 provides a notification to the user, in a case where the print process by the print processing unit 34 is backside discharge, and the excellent page first transported from the reuse tray 16 is not the page with the smallest page number (that is, the excellent page that has first been determined to be good in the inspection process by the inspection processing unit 36) in the excellent page set. Further, the notification processing unit 44 provides a notification to the user, in a case where the print process by the print processing unit 34 is frontside discharge, and the excellent page first transported from the reuse tray 16 is not the page with the largest page number (that is, the excellent page that has first been determined to be good in the inspection process by the inspection processing unit 36) in the excellent page set. Even in this case, the print processing unit 34 stops the reprint process, and the output control unit 42 also stops the discharge control associated with the reprint process.

The page number of the excellent page can be detected by various methods. For example, the page number of the excellent page can be detected by comparing the posture detection image data acquired by the posture detection sensor 30 with the print data. Further, in a case where the page number is described on the excellent page, the page number of the excellent page can be detected by reading the page number.

In a case where an excellent page set including a plurality of excellent pages is disposed on the reuse tray 16, in the present exemplary embodiment, as described above, the posture of one excellent page in the excellent page set (in the present exemplary embodiment, the excellent page at the top) is detected by the posture detection unit 38, and the print setting of the reprint process is determined by the reprint setting determination unit 40, based on the detected posture of the excellent page. Here, the posture detection unit 38 may detect the postures of not only the first excellent page but also the second and subsequent excellent pages. In that case, the posture detection unit 38 may detect that the postures of the plurality of excellent pages disposed on the reuse tray 16 are different from each other. For example, the orientation of the image on the excellent page of the first page is in the upright direction, whereas the orientation of the image on the excellent page of the second page is in the inverted direction. In such a case, since the postures of the excellent pages are originally different from each other, it is not possible to output the excellent page set and the reprinted pages together with the postures aligned.

Figure 5:
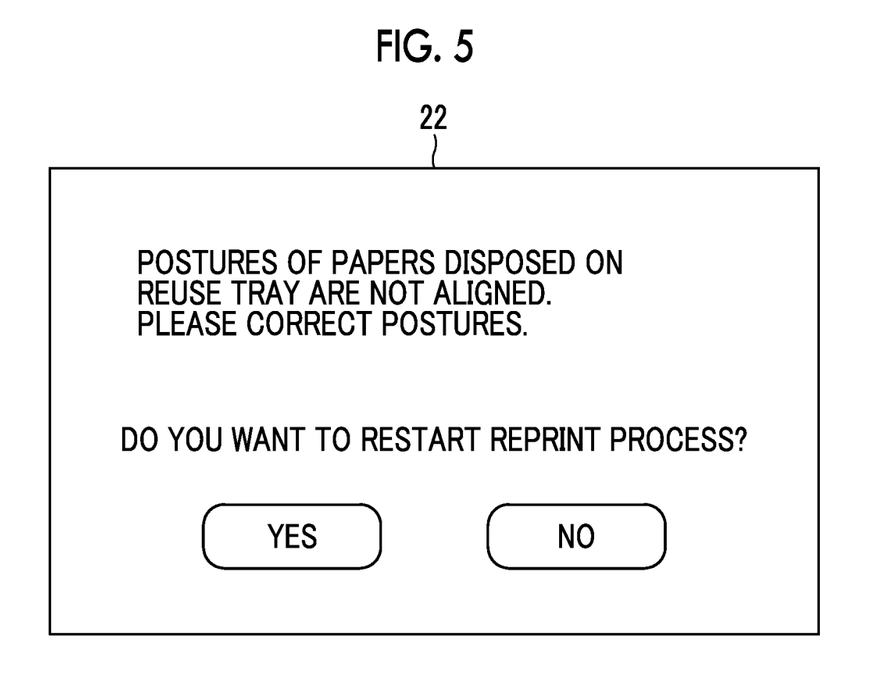
FIG. 5 is a diagram illustrating an example of a screen for notifying that postures of excellent page sets disposed on the reuse tray are different from each other.

Therefore, the notification processing unit 44 may output a notification to the user, in a case where the posture detection unit 38 detects that the postures of the plurality of excellent pages disposed on the reuse tray 16 are different from each other. For example, as shown in FIG. 5, the notification processing unit 44 displays a message such as "The postures of the papers disposed on the reuse tray are not aligned. Please correct the postures." on the display 22.

After the excellent page of which posture is finally detected by the posture detection unit 38 before the notification is output by the notification processing unit 44 is discharged to the OK tray 12, the reprint process by the print processing unit 34 and the transport process of the excellent page and the reprinted page by the output control unit 42 may be interrupted while the notification is output. Then, after aligning the postures of the excellent pages which has been taken out from the OK tray 12 and of which posture has been detected last and the excellent page remaining in the reuse tray 16 with the posture of the excellent page which has already been transported from the reuse tray 16 and discharged to the OK tray 12, the user maybe able to input an instruction to continue the reprint process to the image forming apparatus 10. For example, as shown in FIG. 5, the notification processing unit 44 provides a notification that the postures of the plurality of excellent pages disposed on the reuse tray 16 are different from each other, and displays a message such as "Do you want to restart the reprint process?" and "Yes" and "No" buttons on the display 22.

Then, in a case where the user wants to continue the reprint process, the user instructs the image forming apparatus 10 to continue the reprint process, by operating the "Yes" button, after disposing the excellent page set with the postures aligned as described above on the reuse tray 16. In a case where it is instructed to continue the reprint process, the print processing unit 34 resumes the reprint process, and the output control unit 42 resumes the transport of the print media accompanying the reprint process. In a case where the posture detection unit 38 detects that the postures of the plurality of excellent pages disposed on the reuse tray 16 are different from each other, by making it possible to restart the reprint process according to the user's instruction, the results of a process of transporting the excellent pages from the reuse tray 16 to the OK tray 12, a reprint process, and a process of transporting the reprinted pages obtained by the reprint process to the OK tray 12, until it is detected that the postures of the plurality of excellent pages disposed on the reuse tray 16 are different from each other can be effectively utilized. Thus, the amount of processing of the reprint process and the accompanying transport process is reduced as compared with the case where the reprint process is restarted from the beginning, and the excellent page and the reprinted page can be output together at an earlier stage.

On the other hand, in a case where the user does not want to continue the reprint process, the user can instruct the image forming apparatus 10 to stop the reprint process by operating the "No" button. When the stop of the reprint process is instructed, the print processing unit 34 stops the reprint process, and the output control unit 42 stops the transport of the print media accompanying the reprint process.

Further, it is considered a case where the first page in the discharge control by the output control unit 42 (the first page in a case where the print process by the print processing unit 34 is the backside discharge, and the last page in a case where the print process by the print processing unit 34 is the frontside discharge) is a defective page. In this case, the first page reprint process needs to be executed before the posture detection unit 38 detects the posture of the excellent page. In this case, the reprint setting determination unit 40 performs setting such that the print setting of the reprint process and the print setting of the print process are identical to each other. The print processing unit 34 performs a reprint process with the print settings and discharges the reprinted page to the OK tray 12. After that, when the posture detection unit 38 detects the arrangement posture of the excellent page to the reuse tray 16, in a case where the print settings for the reprint process does not correspond to the arrangement posture of the detected excellent page to the reuse tray 16 (in other words, in a case where the discharge posture of the reprinted page to the OK tray 12 and the discharge posture of the excellent page to the OK tray 12 are different), the notification processing unit 44 outputs a notification to the user. Even in this case, the print processing unit 34 stops the reprint process, and the output control unit 42 also stops the discharge control associated with the reprint process.

The outline of the image forming apparatus 10 according to the present exemplary embodiment is as described above.

Figure 6:
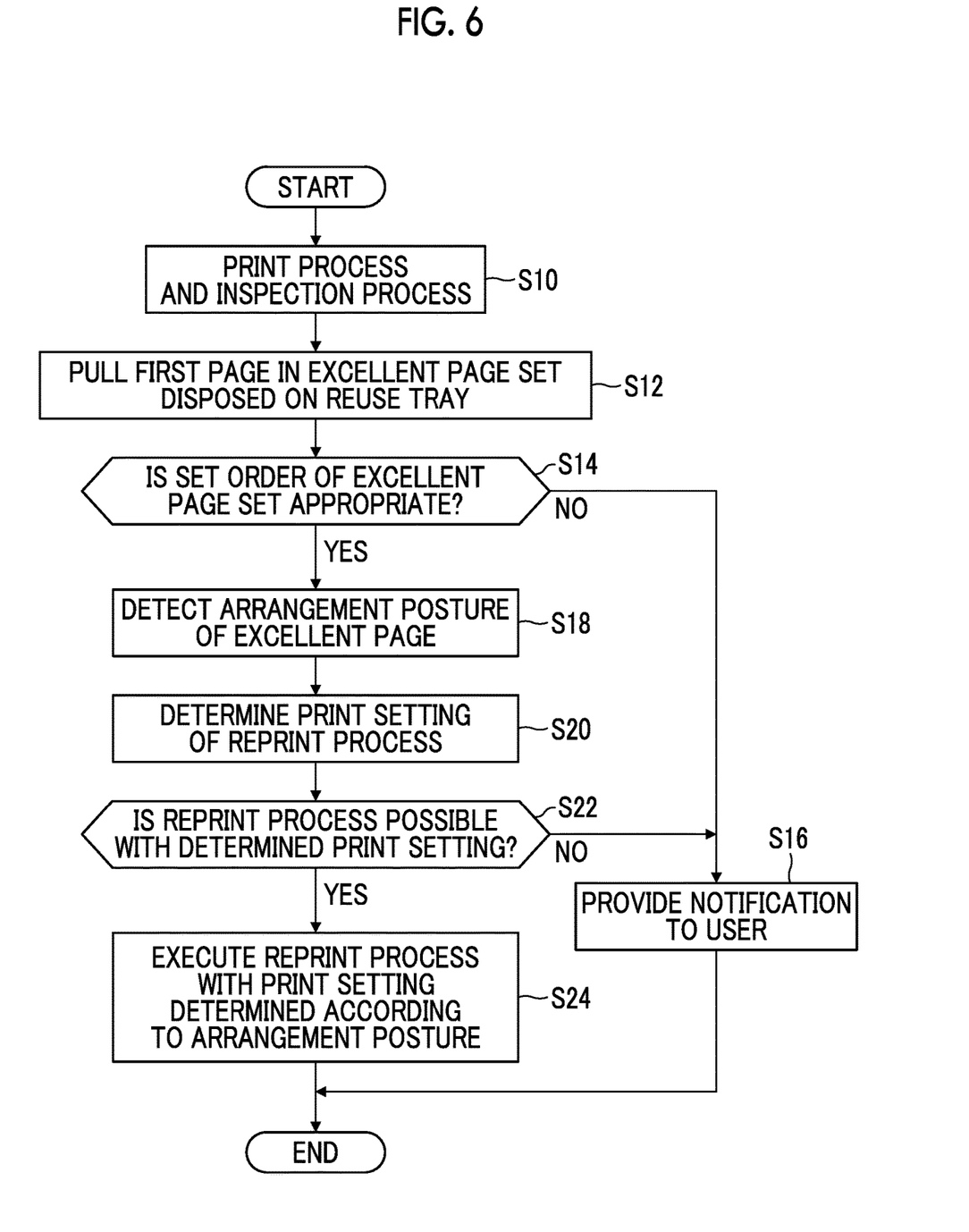
FIG. 6 is a flowchart illustrating a processing flow of the image forming apparatus according to the present exemplary embodiment.

Hereinafter, the processing flow of the image forming apparatus will be described with reference to the flowchart illustrated in FIG. 6.

In step S10, the print processing unit 34 performs the print process on the print media of a plurality of pages, based on the print data for a plurality of pages input by the user. The inspection processing unit 36 determines the quality of the print result of each print media, and the transport device discharges the excellent pages determined to be good to the OK tray 12 and the defective pages determined to be defective to the NG tray 14. The user disposes the excellent page set that has been discharged to the OK tray 12 on the reuse tray 16 and inputs an instruction of the reprint process to the image forming apparatus 10.

In step S12, the posture detection unit 38 pulls the excellent page at the top in the excellent page set disposed on the reuse tray 16 into the image forming apparatus 10.

In step S14, the posture detection unit 38 determines whether or not the page order of the excellent page set disposed on the reuse tray 16 is appropriate, based on the page numbers of the excellent pages pulled in step S12. Specifically, in a case where the print process in step S10 is backside discharge, and the excellent page first transported from the reuse tray 16 is the page having the smallest page number in the excellent page set, or in a case where the print process in step S10 is frontside discharge, and the excellent page first transported from the reuse tray 16 is the page having the highest page number in the excellent page set, the posture detection unit 38 determines that the page order of the excellent page set disposed on the reuse tray 16 is appropriate. On the other hand, in a case where the print process in step S10 is backside discharge, and the excellent page first transported from the reuse tray 16 is not the page having the smallest page number in the excellent page set, or in a case where the print process in step S10 is frontside discharge, and the excellent page first transported from the reuse tray 16 is not the page having the highest page number in the excellent page set, the posture detection unit 38 determines that the page order of the excellent page set disposed on the reuse tray 16 is not appropriate. In a case where it is determined that the page order of the excellent page set disposed on the reuse tray 16 is appropriate, the process proceeds to step S18, and in a case where it is determined that the page order is not appropriate, the process proceeds to step S16.

In step S16, the notification processing unit 44 outputs a notification to the user. Then the process ends.

In step S18, the posture detection unit 38 detects the posture of the excellent page pulled in step S12.

In step S20, according to the posture of the excellent page detected in step S18, the reprint setting determination unit 40 determines the print setting of the reprint process such that the discharge posture of the excellent page, transported from the reuse tray 16, to be discharged to the OK tray 12 and the discharge posture of the reprinted page, acquired through the reprint process, to the OK tray 12 are identical to each other.

In step S22, the notification processing unit 44 determines whether or not the printer 26 can execute the reprint process with the print settings determined in step S20. In a case where the reprint process can be executed, the process proceeds to step S24. In a case where the reprint process cannot be executed, the process proceeds to step S16, and the notification processing unit 44 outputs a notification to the user.

In step S24, the print processing unit 34 executes a reprint process on the defective pages determined in step S10 with the print settings determined in step S20. Due to the discharge control by the output control unit 42 accompanying the reprint process, the excellent pages from the reuse tray 16 and the reprinted pages acquired by the reprint process are discharged together to the OK tray 12 with the postures aligned.

For example, in the present exemplary embodiment, in the transport process of excellent pages from the reuse tray 16 to the OK tray 12, only the front and back orientation of the excellent pages are inverted, and no other posture changes are made, but it is not necessary. For example, in a case where the excellent pages are disposed in a portrait orientation on the reuse tray 16, the front and back orientation and image orientation of the excellent pages may be changed. Even in such a case, the reprint setting determination unit 40 may take into consideration the change in the posture of the excellent page in the excellent page transport process from the reuse tray 16 to the OK tray 12, and then determine the print setting of the reprint process such that the discharge posture of the excellent page to be discharged from the reuse tray 16 to the OK tray 12 and the discharge posture of the reprinted page to the OK tray 12 are identical to each other.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
   a processor configured to
   perform a print process on print media of a plurality of pages, based on print data for the plurality of pages;
   acquire reprinted pages by performing a reprint process on separate print media for defective pages for which a result of the print process is defective, with print settings determined according to an arrangement posture of excellent pages, for which a result of the print process is excellent, on a reuse tray; and
   output the excellent pages transported from the reuse tray and the reprinted pages together.

2. The image forming apparatus according to claim 1, wherein
   the processor is configured to output a notification to a user, in a case where the reprint process is not possible with the determined print settings.

3. The image forming apparatus according to claim 2, wherein
   the processor is configured to notify the user of a reason why the reprint process is not possible with the determined print settings.

4. The image forming apparatus according to claim 1, wherein
   the processor is configured to output a notification to a user, in a case where it is detected that the postures of the plurality of excellent pages disposed on the reuse tray are different from each other.

5. The image forming apparatus according to claim 4, wherein
   the processor is configured to restart the reprint process, in a case where the user instructs to continue the process in response to the notification.

6. A non-transitory computer readable medium storing an image forming program causing a computer to execute a process, the process comprising:
   performing a print process on print media of a plurality of pages, based on print data for the plurality of pages;
   acquiring reprinted pages by performing a reprint process on separate print media for defective pages for which a result of the print process is defective, with print settings determined according to an arrangement posture of excellent pages, for which a result of the print process is excellent, on a reuse tray; and
   outputting the excellent pages transported from the reuse tray and the reprinted pages together.

7. An image forming apparatus comprising:
   means for performing a print process on print media of a plurality of pages, based on print data for the plurality of pages;
   means for acquiring reprinted pages by performing a reprint process on separate print media for defective pages for which a result of the print process is defective, with print settings determined according to an arrangement posture of excellent pages, for which a result of the print process is excellent, on a reuse tray; and
   means for outputting the excellent pages transported from the reuse tray and the reprinted pages together.

* * * * *